US008612641B1

United States Patent
Bozarth et al.

(10) Patent No.: US 8,612,641 B1
(45) Date of Patent: Dec. 17, 2013

(54) PORTABLE COMPUTING DEVICE AS CONTROL MECHANISM

(75) Inventors: Bradley J. Bozarth, Sunnyvale, CA (US); Mingjing Huang, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 66 days.

(21) Appl. No.: 13/118,830

(22) Filed: May 31, 2011

(51) Int. Cl.
*G06F 3/00* (2006.01)
*G06F 13/38* (2006.01)
*G06F 9/00* (2006.01)

(52) U.S. Cl.
USPC ............. 710/15; 710/18; 710/62; 710/65; 713/100

(58) Field of Classification Search
None
See application file for complete search history.

(56) References Cited

U.S. PATENT DOCUMENTS

| | | | | |
|---|---|---|---|---|
| 6,225,984 | B1 * | 5/2001 | Crawford | 345/173 |
| 7,054,965 | B2 * | 5/2006 | Bell et al. | 710/72 |
| 7,949,708 | B2 * | 5/2011 | Wang et al. | 709/203 |
| 2001/0055978 | A1 * | 12/2001 | Herrod et al. | 455/517 |
| 2002/0009972 | A1 * | 1/2002 | Amento et al. | 455/66 |
| 2002/0022507 | A1 * | 2/2002 | Dan et al. | 463/1 |
| 2004/0054757 | A1 * | 3/2004 | Ueda et al. | 709/219 |
| 2005/0193143 | A1 * | 9/2005 | Meyers et al. | 709/238 |
| 2005/0212753 | A1 * | 9/2005 | Marvit et al. | 345/156 |
| 2005/0212756 | A1 * | 9/2005 | Marvit et al. | 345/156 |
| 2006/0033702 | A1 * | 2/2006 | Beardsley et al. | 345/156 |
| 2006/0268007 | A1 * | 11/2006 | Gopalakrishnan | 345/619 |
| 2007/0066323 | A1 * | 3/2007 | Park et al. | 455/456.2 |
| 2007/0141988 | A1 * | 6/2007 | Kuehnel et al. | 455/41.2 |
| 2007/0158335 | A1 * | 7/2007 | Mansbery | 219/505 |
| 2008/0297589 | A1 * | 12/2008 | Kurtz et al. | 348/14.16 |
| 2009/0033618 | A1 * | 2/2009 | Norager | 345/156 |
| 2009/0251409 | A1 * | 10/2009 | Parkinson et al. | 345/156 |
| 2010/0315333 | A1 * | 12/2010 | Hsu | 345/157 |
| 2011/0074679 | A1 * | 3/2011 | West et al. | 345/163 |

\* cited by examiner

*Primary Examiner* — Michael Sun
(74) *Attorney, Agent, or Firm* — Novak Druce Connolly Bove + Quigg LLP

(57) ABSTRACT

A portable or mobile computing device, such as a smart phone or portable media player, can be used to control one or more electronic devices over an appropriate wireless channel. In one example, a user can utilize a smart phone as a mouse for a notebook computer or Internet-capable television. The user can move the portable device on a surface and press appropriate selectable elements on the portable device, as if the user is using a wireless mouse. The portable device can send the commands over the wireless channel to the electronic device, which can provide inputs and/or control signals to the electronic device. In some embodiments, the user can take advantage of the processing capability of the portable device to work directly with elements such as a wireless keyboard and wireless monitor, without the need for a notebook or other such computing element therebetween.

32 Claims, 6 Drawing Sheets

PORTABLE COMPUTING DEVICE AS CONTROL MECHANISM

BACKGROUND

People are increasingly utilizing portable computing devices that have a wide variety of capabilities. In many cases, these devices can communicate over various wireless channels, and include a wide variety of input mechanisms. Unfortunately, many computing and electronic devices still rely upon traditional control mechanisms and configurations. For example, a business traveler might take both a smart phone and a notebook computer on a business trip. If the traveler wants to be able to use a mouse with the notebook computer, the traveler must also bring a mouse on the trip. Similarly, if the traveler wants to use a touch pad, pointer, or other such element, the traveler still must bring these devices as well. Conventional approaches do not take advantage of functionality of various devices that can do away with the need to carry or acquire at least some of these additional devices. Further, as notebooks and portable computing devices continue to merge the types of functionality available, there should be less of a need to have to transport both devices to perform a particular task.

BRIEF DESCRIPTION OF THE DRAWINGS

Various embodiments in accordance with the present disclosure will be described with reference to the drawings, in which.

DETAILED DESCRIPTION

Figure 1:
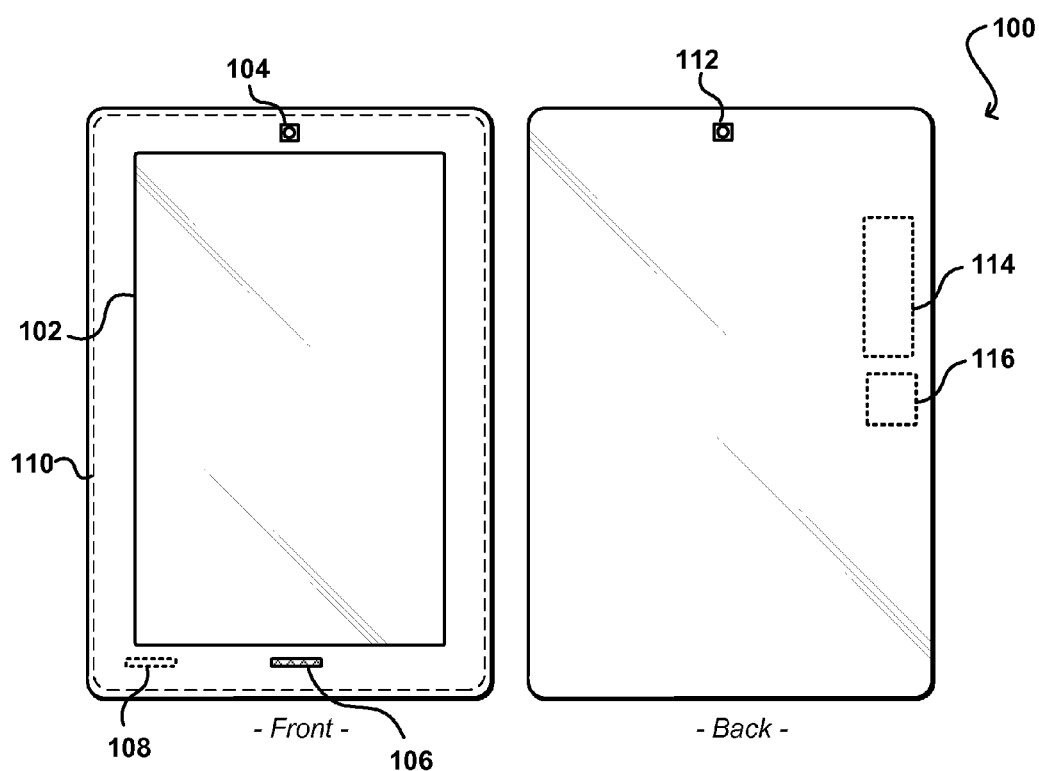
FIG. 1 illustrates front and back views of an example portable computing device that can be used in accordance with various embodiments.

Systems and methods in accordance with various embodiments of the present disclosure may overcome one or more of the aforementioned and other deficiencies experienced in conventional approaches to controlling functionality in an electronic environment. In particular, various approaches take advantage of the existing technology in various types of portable and/or mobile computing devices to enable those devices to act as control mechanisms for various other types of electronic device. For example, a portable computing device can determine information such as motion and user inputs. If the portable computing device is able to communicate with another electronic device, such as over a wireless connection, the portable computing device can provide various types of input as control signals to the electronic device.

In one embodiment, a portable computing device such as a smart phone is able to utilize a wireless communication channel such as Bluetooth® or Wi-Fi to communicate with various devices, such as notebook computers, monitors, keyboards, projectors, and the like. The portable computing device can accept various types of input from a user, such as button presses or motions on a touch screen. The portable computing device can provide information for these inputs to an electronic device, which can utilize that information to control or adjust one or more aspects of the electronic device. For example, a user might press on a virtual button displayed on a touch screen of the portable device to indicate that the user wants to power off a particular electronic device. The portable device can accept the input, determine any conversion or formatting needed to communicate with the electronic device, then send that input to the electronic device as a control signal. The electronic device can analyze the signal when received, and perform the corresponding action, in this case to power down the device.

In some embodiments, a portable computing device can take advantage of the fact that the device can determine motion, which can be used to provide various types of input to electronic devices. For example, a portable computing device might have motion or inertial determining elements, such as accelerometers, electronic gyroscopes, or inertial sensors, that enable the device to determine a direction and/or amount of movement. Similarly, various portable devices include cameras, infrared transceivers, and/or other such image capture elements that can be used to determine motion by analyzing the relative position of various points in a series of images or video feed. Other mechanisms such as audio triangulation devices and global positioning system (GPS) elements can be used to determine changes in position as well. Being able to determine motion enables a portable computing device to provide motion- and/or direction-based input to another device. For example, the motion of a computing device can be used to control the position of a cursor on a monitor or notebook display, effectively functioning as a wireless mouse for that device. Similarly, the motion of the portable device can be used to provide input to a video game system, drive motor, robot, or other such electronic element capable of receiving and utilizing motion, position, or direction-based input. A portable computing device thus can potentially provide control input to any electronic device having a compatible communication channel, a known format for commands, and authorization or access to provide commands to the electronic device.

In some embodiments, a portable computing device can act less like a wireless peripheral device for another computing device, and can instead take advantage of the computing capacity of the computing device to provide output and/or control signals to various electronic and/or peripheral devices. For example, in some embodiments a portable computing device such as a smart phone can function as a wireless mouse for a desktop computer, which displays content on a monitor. If that monitor is capable of receiving wireless input directly from the portable computing device, a similar result can be obtained by having the portable device act as the desktop in addition to the wireless mouse, and send the image information resulting from (at least in part) the mouse input directly (or indirectly) to the monitor. Thus, a user of a portable computing device can have content displayed on, or provided to, any compatible device, where that content is controlled and provided by the portable computing device itself.

Various other applications, processes and uses are presented below with respect to the various embodiments.

FIG. 1 illustrates front and back views of an example portable computing device 100 that can be used in accordance with various embodiments. Although one type of portable computing device (e.g., a smart phone, an electronic book reader, or tablet computer) is shown, it should be understood that various other types of electronic device that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 100 has a display screen 102 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 110 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the computing device in this example includes one image capture element 104 on the "front" of the device and one image capture element 112 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology. The computing device can also include at least one microphone 106 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 100 in this example also includes at least one motion- or position-determining element 108 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 114, such as may include at least one wired or wireless component operable to communicate with one or more electronic devices. The device also includes a power system 116, such as may include a battery operable to be recharged through conventional plug-in approaches, or through other approaches such as capacitive charging through proximity with a power mat or other such device. Various other elements and/or combinations are possible as well within the scope of various embodiments.

Figure 2:
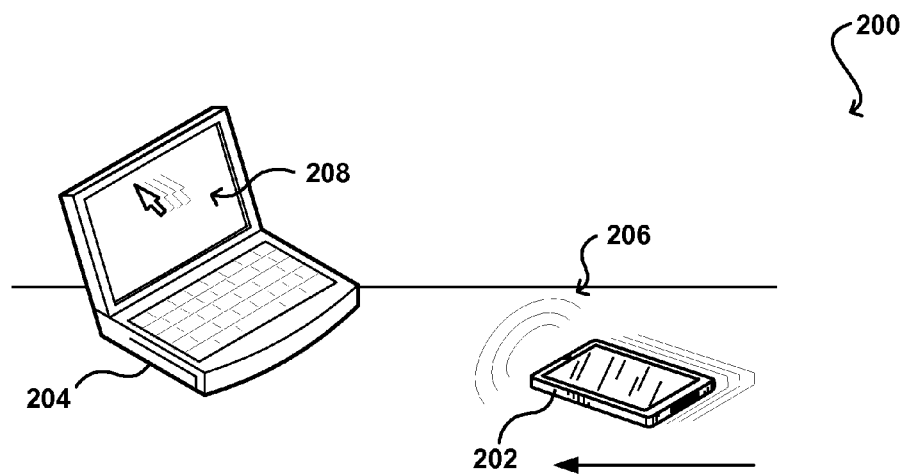
FIG. 2 illustrates an environment in which a portable computing device is operable to function as an input mechanism for another computing device in accordance with various embodiments.

As discussed, the functionality provided by elements such as those discussed with respect to FIG. 1 enable a portable computing device to communicate with other electronic devices, and function as a control mechanism or other such device that can interact with an electronic device and, in some cases, expand the functionality of that device. For example, FIG. 2 illustrates an example situation 200 wherein a portable computing device 202 is within wireless communication range of another computing device, in this example a notebook computer 204. It might be the case that a user of the notebook computer might prefer to use a device such as an optical mouse to control the position and/or actions of a cursor 208 on a display of the notebook computer. In many cases, however, the user will not always want to haul the optical mouse around with the notebook, or might not have a mouse available that is compatible with the notebook computer.

In this example, the notebook computer is able to communicate over at least one wireless channel, such as Bluetooth or Wi-Fi. If the user also has a portable computing device capable of communicating over at least channel in common with the notebook, the portable computing device can provide mouse-like control commands to the notebook. For example, the user might have a smart phone or portable media player on hand, which can communicate with the notebook computer 204 using a Bluetooth signal 206. If the portable device 202 has one or more elements operable to function as a mouse button, such as a physical button on the device or a virtual element on a display element of the device, the portable device can receive the input from the user, perform any reformatting or manipulation of the input such that the notebook computer will understand the desired input, and transmit that information over the communications channel to the notebook computer. As another example, a user who is faster using swipe input than typing on a notebook keyboard might use the portable device to enter text, which can be provided to the notebook computer as input. Various other inputs can be provided as well as should be apparent in light of the teachings and suggestions contained herein.

Similarly, the portable device 202 can use any motion input to provide control signals or other such input to the notebook computer 204. In this example, a user is moving the portable device to the left (in the plane of the Figure). Using any of a number of approaches discussed herein, the portable device can detect this motion and determine an extent of the motion. Based at least in part upon this information, the portable device can generate one or more signals to be transmitted to the notebook computer that provide information related to the motion. In some embodiments, the signal can be the same signal as would be received by a wireless mouse. In other embodiments, the portable device might send the information in another format, or including other types of information, necessary to pass that information along to the notebook computer. It can be seen in FIG. 2 that a cursor 208 on a display screen of the notebook computer 204 is moving in a direction corresponding to the motion of the portable device. Thus, as long as the portable computing device is able to determine relative motion and provide information about that motion to the notebook computer, the portable device can function as a mouse or similar control mechanism for the notebook.

In at least some embodiments, a connection must be established before a computing device can provide input and/or control any aspect of another device. For example, an application can be executed on the portable device and/or the other device enabling communications to occur. In some embodiments, a portable device will send a request to the other device asking to be able to control the other device, which can cause a prompt to the generated on the other device to be accepted or denied by a user. Similarly, the other device might notice a portable device within range and prompt the user as to whether to allow at least certain types of communications with the portable device. In some embodiments, identifying information must be entered into the other device that identifies the portable device or a user of the portable device, such that when a request is received with that identifying information, or when a device with known identifying information is within range of the other device, the other device can automatically enter a mode where the portable device is able to provide input. In at least some embodiments, a user of the portable device must also enable the portable device to enter a control mode or other such state for providing input to the other device. For example, a user might occasionally use a smart phone to control a notebook computer, but may not want to provide input to that notebook any time the smart phone is moved within a given range of the notebook. Any of a number of other manual or automatic permission approaches can be used as well within the scope of the various embodiments.

In at least some embodiments, the portable device can automatically determine the proper format for a control signal for another device based upon an initial identification or handshake process. In other embodiments, the portable device might request format information from the other device, or might send communications in different formats until an appropriate acknowledge signal is sent back from the other device. Various other approaches to determining a common method of communication can be used as well as should be apparent.

In the example of FIG. 2, the portable device is effectively functioning at least in part as an optical mouse or other wireless peripheral device, in that the portable device is providing input that is then processed by the notebook computer. In other examples, however, the input can be processed on the portable device itself and the results of the processing sent to another electronic device, thus taking advantage of at least some of the computing capacity on the portable computing device.

Figure 3:
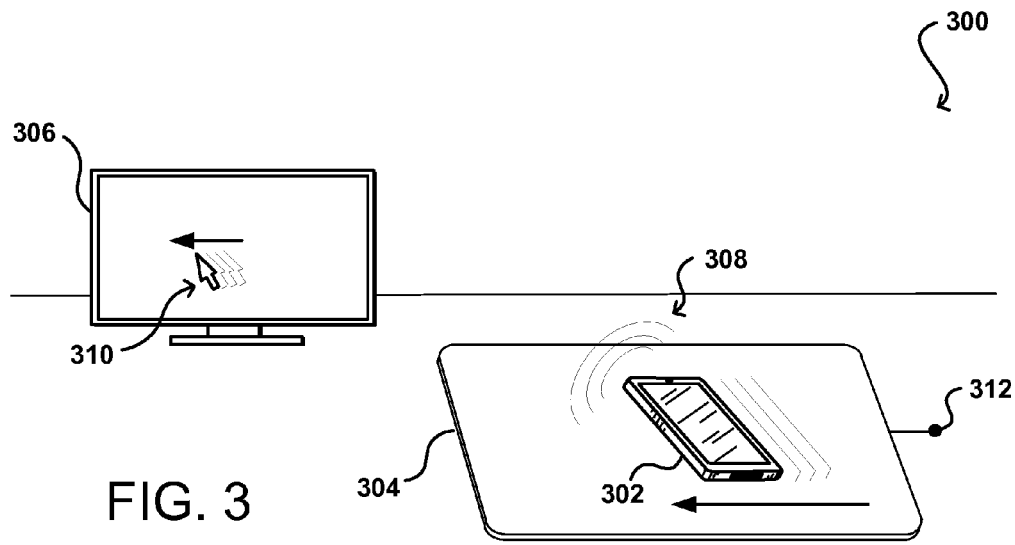
FIG. 3 illustrates an environment in which a portable computing device is operable to function as a computer and input mechanism for use with an electronic device in accordance with various embodiments.

For example, FIG. 3 illustrates an example situation 300 wherein a portable computing device 302 again controls the position and/or action of a pointer 310 or other such selection element on a monitor 306 or other such display element. In this example, however, the portable computing device is not sending motion or input information to be processed by a notebook computer, or other such computing device, but is instead sending information directly to the monitor 306 over a wireless channel 308. In one embodiment, the portable computing device uses the input information to determine a position of the pointer with respect to an interface or other image to be displayed on the monitor, and then renders the image with the appropriate position or state of the pointer. The computing device then can send the image information, or changes in the image information, to the monitor for display. The monitor can be, for example, a wireless Internet-capable display that is able to receive a wireless signal containing image information being streamed or otherwise transmitted over the signal, and then display that image information accordingly.

Such an approach enables the portable computing device to not only act as the mouse, touchpad, joypad, or other such input device, but to also act as the computing or processing device as well. Thus, a user can utilize a monitor or television for display of various types of content, which can be controlled using the portable computing device, without the need for an additional device connected to the display. Such functionality enables any user to be able to access a keyboard, monitor, printer, or other such device automatically over the wireless signal, and be able to control and provide content to that device. For example, a business traveler can access a monitor or keyboard anywhere such that the traveler only has to carry his or her phone. A movie fan can playback any of a number of movies through any friend's television without having to hook up a device to that television that is able to obtain and render the desired content. Further, the user can control the content using the portable device without need for a remote control or other peripheral device.

In at least some embodiments, a portable computing device can execute one or more applications or processes on the portable computing device, and export information from that processing to one or more electronic devices. For example, a user might execute a virtual desktop application on a portable device. If that portable device is able to communicate with a notebook or laptop computer, for example, the virtual desktop contained in the portable device can be exported to a notebook computer or desktop computer for display on a screen that is larger, higher resolution, etc. In this example, the portable device might not control any aspects of the notebook computer at all, but can update the state of a desktop application based at least in part upon movement of the portable device then provide updated image information to the notebook computer for display. The information can include audio, video, or other types of information for presentation as well. Such an approach can enable a user to effectively use any compatible computer as a guest terminal without any need to install applications on the computer, configure settings, etc., as all that information can come from, and be processed on, the portable device in at least some embodiments.

In the example of FIG. 3, the portable computing device 302 is shown to be positioned on a pad 304. In at least some embodiments, this pad is a "power" pad that is connected to at least one power source 312 (i.e., plugged into an electrical outlet). The power pad can work together with the power elements of the portable device to capacitively charge the portable device. In addition, the pad can help the device to determine movement and/or ensure calibration or location correlation with another electronic device.

For example, devices that utilize accelerometers or inertial sensors can determine relative motion and provide input based upon that movement. There can be issues with such approaches, however, as some of these devices are not very precise, and can tend to drift over time. Accordingly, certain portable devices can instead rely upon optical approaches, such as through image capture. In some embodiments, the portable device can utilize an image capture element such as a camera that is facing downward, such as towards the power mat. In order to capture image information, the device can provide a source of illumination, such as infrared (IR) radiation from an IR emitter or ambient light from an LED or other such source. As known in the art for optical mice and other such elements, the device can capture image information for the reflected light and monitor movement of features in the captured images to determine a direction and amount of movement of the device. A benefit to the power pad is that the pad can be at least slightly textured, which can help to improve the accuracy of the motion detection.

In at least some cases, however, it may be undesirable to use a downward-facing camera as such an approach generally requires a source of illumination, which can quickly drain the battery on a portable device. When the device is on a power pad, this concern may not be as great, but without the power pad (or where energy conservation is desired) it can be desirable to limit the amount of illumination needed. Thus, in at least some embodiments a portable device can use at least one imaging element that is not facing downward. For example, the portable device can utilize an "upward" facing camera that can use features on a ceiling for motion detection. While such an approach can depend at least in part upon the height of the ceiling to determine an amount of movement, the device can enable the user to adjust the "speed" of the determined movement based upon the current conditions. The device also can utilize one or more additional cameras directed in other directions, such as to the sides of the device, to assist with the motion determination. Various other ways for determining motion through image capture and analysis can be used as well as should be apparent.

Figure 4:
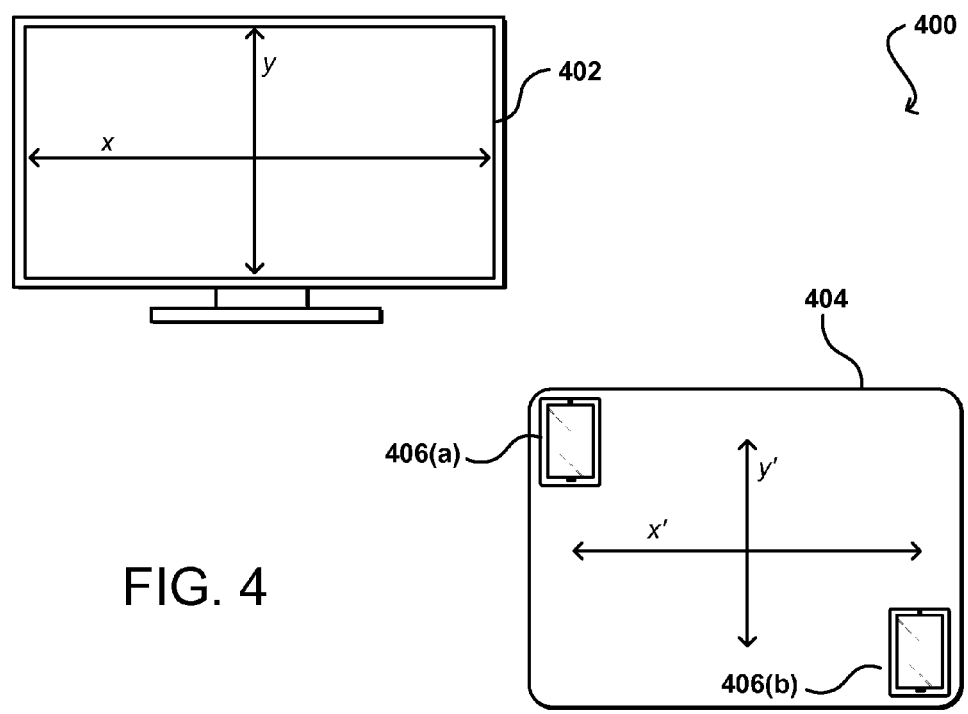
FIG. 4 illustrates an example of a calibration determination that can be used in accordance with various embodiments.

Another advantage to using a power pad is that there can be an easily correlated range of motion with respect to the device receiving the input. For example, FIG. 4 illustrates an example situation 400 wherein a portable device 406 is providing input to a display device 402. As illustrated, the display device is capable of displaying information in a display area defined by x and y. The amount of movement of a cursor as controlled by the device thus can be limited to an area bounded by x and y, except possibly where wraparound movement is enabled. Similarly, if the portable device 406 is placed on a pad 404, the range of possible movement of the device on the pad is defined by x' and y', where x' and y' are less than the full width and height of the top surface of the mat due to the form factor of the portable device.

In at least some embodiments, it is desirable to be able to associate the range of movement (x', y') with the range of the display (x, y) such that a movement over half of the range of the mat moves the cursor over half of the range of the display. In at least some embodiments, the portable device can request that the user go through a calibration procedure to determine the relative corners of the mat. In other embodiments, the portable device might "learn" the location of the boundaries based on the extent to which the user moves the device on the mat. In still other embodiments, the mat might be able to communicate with the portable device through a wireless connection, for example, to convey to the device the relative dimensions of the mat. Once the portable device determines its location on the mat, such as by detecting a specific feature on the mat, the portable device can also know the relative bounds of the mat.

In some embodiments where there is a sufficient amount of texture on the mat, and where the capacitive touch or other touch-sensitive elements on the device offer sufficient sensitivity, the portable device can also track the position of features of the mat relative to movement of the portable device to determine an amount of movement of the device. The approach would be similar to the optical approach, but there would be no need for illumination. Further, the device would analyze a grid of pressure or contact points, etc. instead of analyzing captured image information. Such an approach could be used on other surfaces as well, although rollable debris and other such features can provide inaccurate results.

Connecting the portable device wirelessly to an electronic device and/or charging element enables other functionality to be implemented as well. For example, data can be synced between the devices, and a network connection from the portable device can be used to locate information for a connected device. Data backup can occur, as well as charging or other such actions.

In some situations, there might be multiple portable devices capable of controlling a remote device, or multiple remote devices capable of being controlled by a portable computing device. In some embodiments, there can be at most one designated "master" at any given time, such that the first portable device to connect with a controllable device can be the only portable device operable to provide control signals until such time as that master device relinquishes control, such as by manually terminating the control state, by moving out of detection and/or communication range of the controllable device, or another such action. In some embodiments, multiple portable devices can concurrently provide control signals to an electronic device, for at least a minimum number of operations. For example, a projector might be projecting a presentation rendered on a notebook computer. If there are multiple portable devices in the room that can connect with the notebook and/or projector, each portable device can provide control signals in at least some embodiments, such as where each portable device can control a pointer associated with that device. While there still might be a master device operable to advance the presentation in some cases, each portable device might have a unique pointer (by shape, color, etc.) associated therewith such that each user of a portable device can point to items on the screen that are being discussed. In some cases, a pointer will only be displayed for a portable device when that device is moved in a control motion, for example, such that if there are twenty devices in the room there will not be twenty cursors displayed during the entire presentation. In some embodiments, a cursor or pointer will pop up any time a user with a portable device in a control mode moves the device in a mouse-like fashion, and in at least some cases that user's name or a similar identifier can be displayed with the pointer or on the edge of the screen so viewers can associate the pointer with the person talking, for example. After a period of inactivity, such as about five seconds, the pointer for a user can disappear from the display. Various other approaches can be used as well within the scope of the various embodiments.

Similarly, a portable computing device might be able to control multiple electronic devices within a given range of the portable device. For example, the portable device might be able to provide control signals to a notebook computer, a television, and a tablet PC that are all within range of the portable device. In at least some embodiments, the portable device can provide one or more icons or other selectable elements enabling the user to select a device to receive the commands. For example, if the user wants to change the channel on the television while using the portable device as a mouse for the notebook, the user can select an option to switch to control the television, provide the appropriate input, then select an option to move back to notebook control. In at least some embodiments, an icon or selectable element will appear on a display of the portable device for each nearby device that the portable device is able to detect and/or with which the portable device is able to communicate. Other approaches are possible as well, such as cycling through the devices or requiring a user to manually select one device to control.

Some control modes might activate automatically based at least in part upon an action of the user or location of the portable device. For example, a power pad might be able to communicate with a portable device such that the portable device can determine when it has been placed on the power pad. If the device is used to control a monitor and keyboard when placed on the power pad, the portable device can automatically go into a control mode where the portable device works with the power pad, monitor, and keyboard. The communication and automatic mode adjustments can work the other way as well, such as where the power pad will only charge a device that is recognized, and the keyboard and monitor will only communicate with a recognized device, in some cases only from a recognized device that is in contact with the power pad. Various other combinations and requirements can be used as well. Such an approach enables the intelligence of the power pad or another such element to provide a type of authentication for devices such as wireless keyboards and monitors which might not otherwise have the capability of verifying the identity of a user, device, etc. The power pad could authenticate the device, and then send an identifier or other information to certain nearby components that those components can accept control commands from a particular device, where the commands from that device might also include the selected identifier, which can be assigned, randomly generated, etc.

In some embodiments, a portable device might not store information indicating how to communicate with a particular type of device. For example, a monitor from a particular manufacturer might use a proprietary format or specific set of commands that might not be stored on the portable device. In at least some embodiments, the portable device can determine some identifying information for the monitor over the wireless channel, such as an identifier received over Bluetooth, which can be submitted to a remote location, such as a central server or compatibility service across a network or "in the cloud," whereby the portable device can receive the necessary information to communicate with that electronic device. In at least some embodiments, the portable device can also receive authentication and/or credentials necessary to communicate with a particular device. In at least some embodiments, where the portable device is not able to communicate directly with another electronic device, the portable device can send the commands across a network (e.g., the Internet) to a system or service that is operable to translate the commands and send the commands to the device. In this way, the portable device is still operable to function as a mouse or other control mechanism for the electronic device, but does not need to first download or convert commands in a format or protocol that is specific to the electronic device. Such an approach can reduce resource needs and/or usage on the portable device, and can enable formats or protocols to remain proprietary as a party associated with a particular type of device can handle the translation of any commands and then forward the translated commands as appropriate.

Figure 5A:
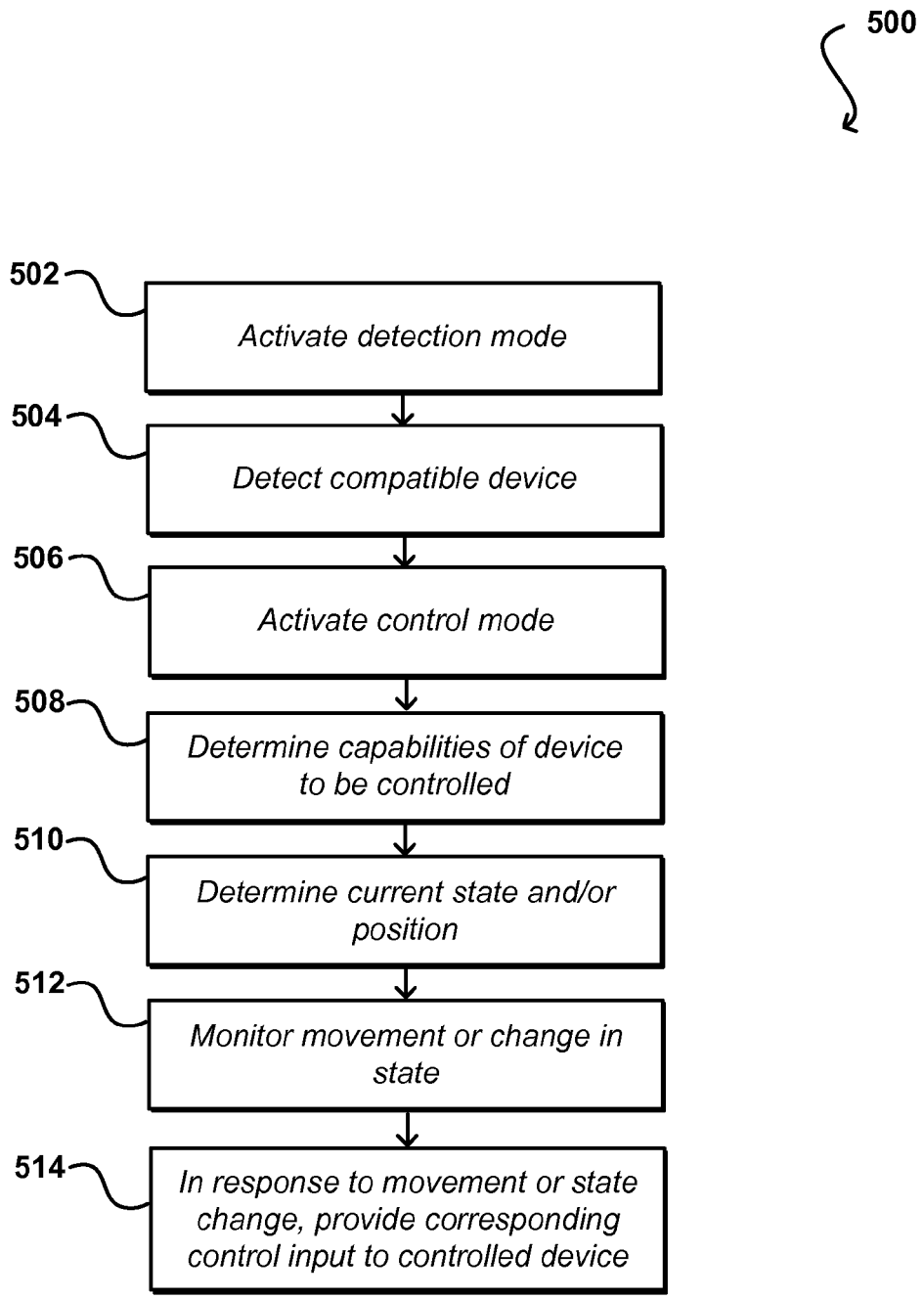
FIGS. 5(a) and (b) illustrate example processes for utilizing a portable computing device with at least one other electronic device that can be used in accordance with various embodiments.

FIG. 5(a) illustrates an example process 500 for enabling a portable computing device to control another electronic device in accordance with at least one embodiment. It should be understood that, for any process discussed herein, there can be additional, fewer, or alternative steps performed in similar or alternative orders, or in parallel, within the scope of the various embodiments unless otherwise stated. In this example, a detection mode is activated on the portable electronic device 502. In some embodiments where the detection mode is Bluetooth or Wi-Fi, the detection mode can be active any time these capabilities are active on the device. In other embodiments, the detection mode can be manually activated by a user, automatically activated when a specific application is executing on the device, or can be activated automatically in response to a specific action or event, such as the device determining that it has been placed on a power pad, etc. While in the detection mode, the portable electronic device can detect at least one compatible electronic device 504. If the portable device has not previously communicated with the electronic device, the portable device might have to go through an authentication or translation procedure as discussed elsewhere herein to enable communications with the electronic device.

If the portable device is able to communicate with the electronic device, the portable device can activate a control mode 506, either automatically or in response to a user action or other event as discussed elsewhere herein. The portable device can attempt to determine the capabilities of the electronic device 508, such as the types of input available, controllable aspects of the electronic device, etc. In some instances the information may be stored on the portable device, such as may be a result of previous communication, while in other instances the information might be pulled from the electronic device or from another source, such as a service available across the Internet. The portable device in at least some embodiments can track changes in a state of the portable device, which may be based at least in part upon determining a current state and/or position 510, such as a location on a power pad, a state of various inputs on the portable device, etc. The portable device then can attempt to detect and/or monitor any relevant changes in the state of the portable device 512, such as a lateral movement on a surface, a selection of an appropriate element, etc. In such a movement or change in state is detected, a corresponding control command or signal can be generated and sent to the electronic device 514, thus enabling the portable device to function as a control mechanism for at least some aspects of the electronic device. Various other approaches can be used as well as discussed or suggested elsewhere herein.

Figure 5B:
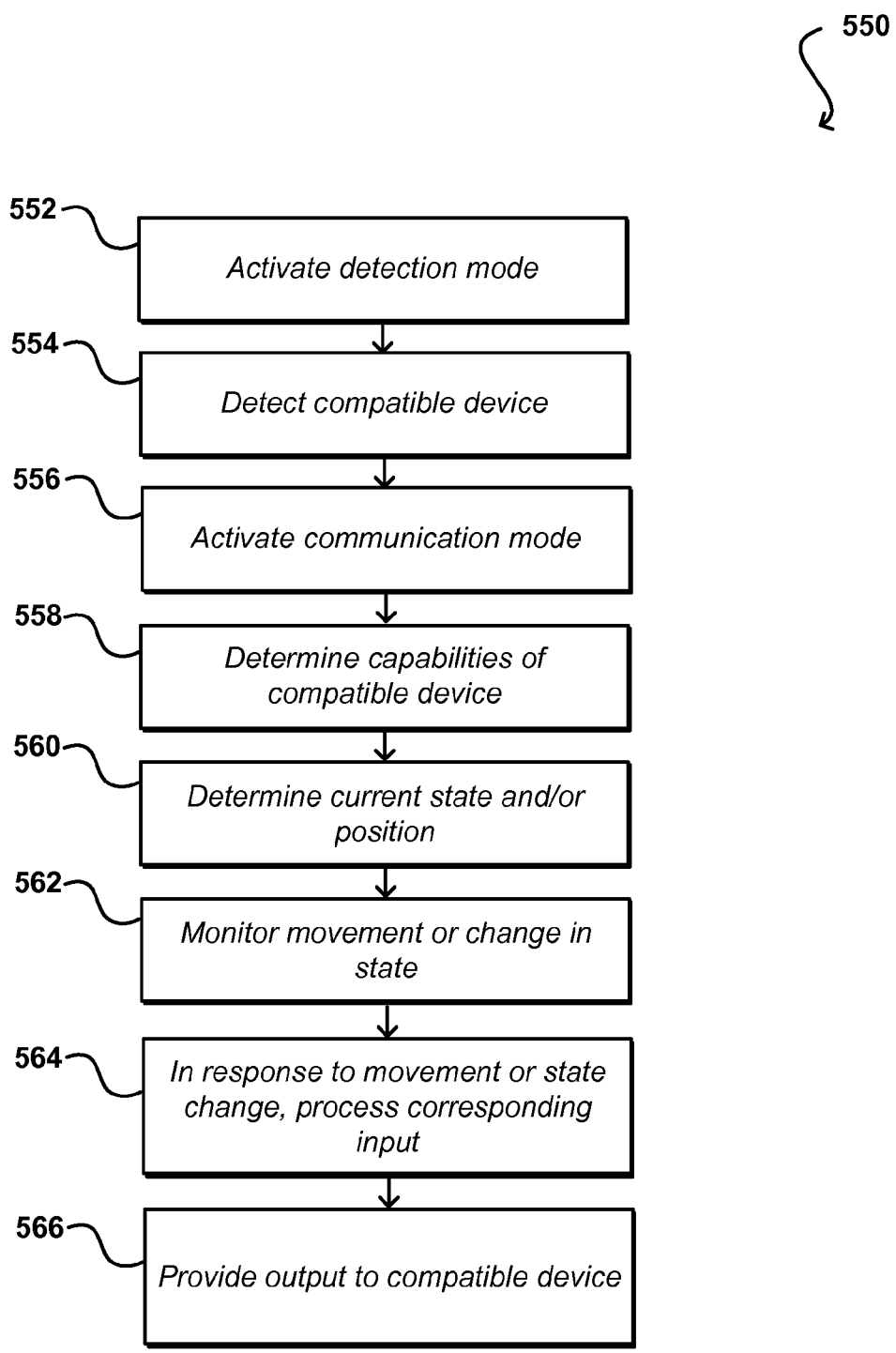

FIG. 5(b) illustrates another example process 550 for enabling a portable computing device to interact with at least one other electronic device in accordance with at least one embodiment. While the portable computing device can still perform functionality as described with respect to FIG. 5(a), the device also might interact with another electronic device in a way that is not controlling, per se, but providing information, instructions, or content that can be utilized on the other device. For example, a computing device might utilize a television or notebook computer screen as a larger display element for the computing device, without otherwise controlling functionality of the device. In such an example, much (if not all) of the processing is done on the portable computing device itself, and information resulting from the processing is provided to the other electronic device.

In this example, a detection mode is activated on the portable electronic device 552 as discussed above. While in the detection mode, the portable electronic device can detect at least one compatible electronic device 554. If the portable device has not previously communicated with the electronic device, the portable device might have to go through an authentication or translation procedure as discussed elsewhere herein to enable communications with the electronic device. If the portable device is able to communicate with the electronic device, the portable device can activate a communication mode 556, either automatically or in response to a user action or other event as discussed elsewhere herein. The portable device can attempt to determine the capabilities of the electronic device 558, such as the types of input available, display characteristics, etc. The portable device in at least some embodiments can track changes in a state of the portable device, which may be based at least in part upon determining a current state and/or position 560, such as a location on a power pad, a state of various inputs on the portable device, etc. The portable device then can attempt to detect and/or monitor any relevant changes in the state of the portable device 562, such as a lateral movement on a surface, a selection of an appropriate element, etc. In such a movement or change in state is detected, a corresponding input can be processed on the portable device 564. After processing of the input on the portable device, any information, instructions, or content relevant for the other electronic device can be communicated to that device 566. As discussed, this can include actions such as sending an image of a virtual desktop state to the device, sending information to be displayed or printed, or various other actions discussed or suggested herein. In some cases, the portable device can function as a full fledged desktop device, with the less portable device being used primarily for display or presentation, etc.

Figure 6:
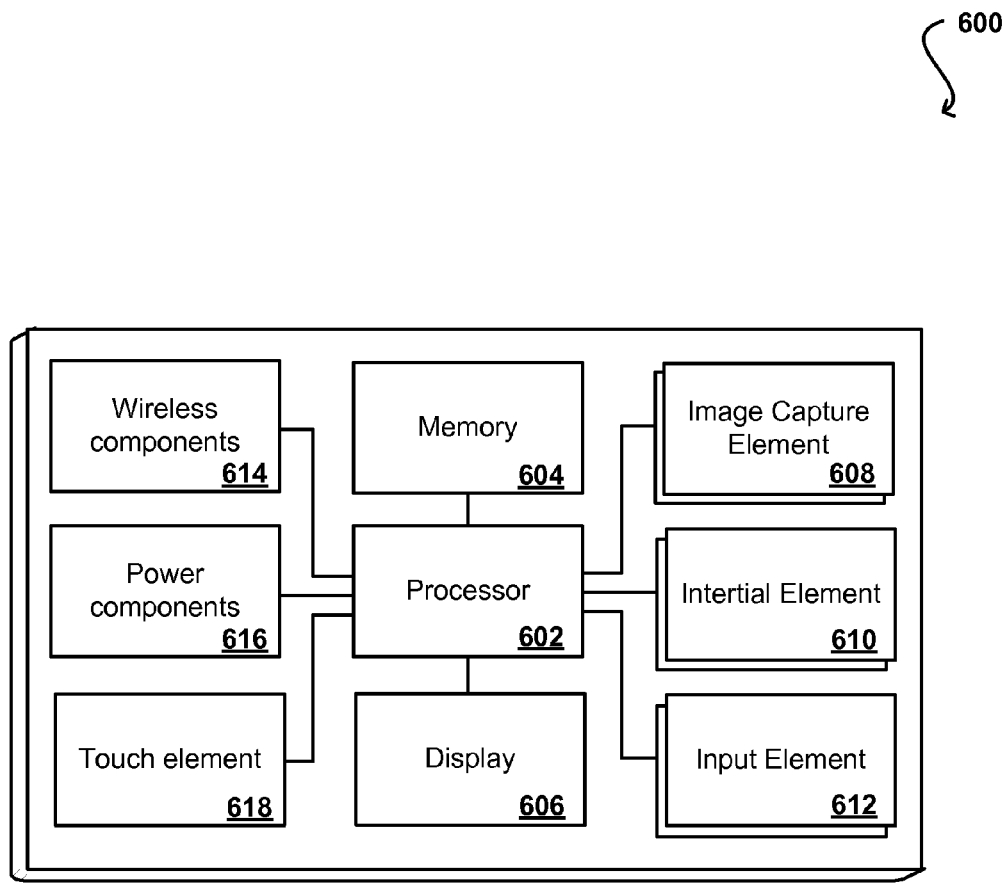
FIG. 6 illustrates an example configuration of components of a portable computing device that can be used in accordance with various embodiments.

In order to provide functionality such as that described with respect to FIGS. 5(a) and 5(b), FIG. 6 illustrates an example set of basic components of a computing device 600, such as the device 100 described with respect to FIG. 1. In this example, the device includes at least one processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 608, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine movement of the device, as discussed herein. An image capture element can include any appropriate technology, such as a CCD image capture element having a sufficient resolution, focal range and viewable area, to capture an image of the user when the user is operating the device. The device can include at least one additional input device 612 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 616 known in the art for providing power to a computing device, which can include capacitive charging elements for use with a power pad or similar device as discussed elsewhere herein. The example device also can include at least one touch- and/or pressure-sensitive element 618, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

Figure 7:
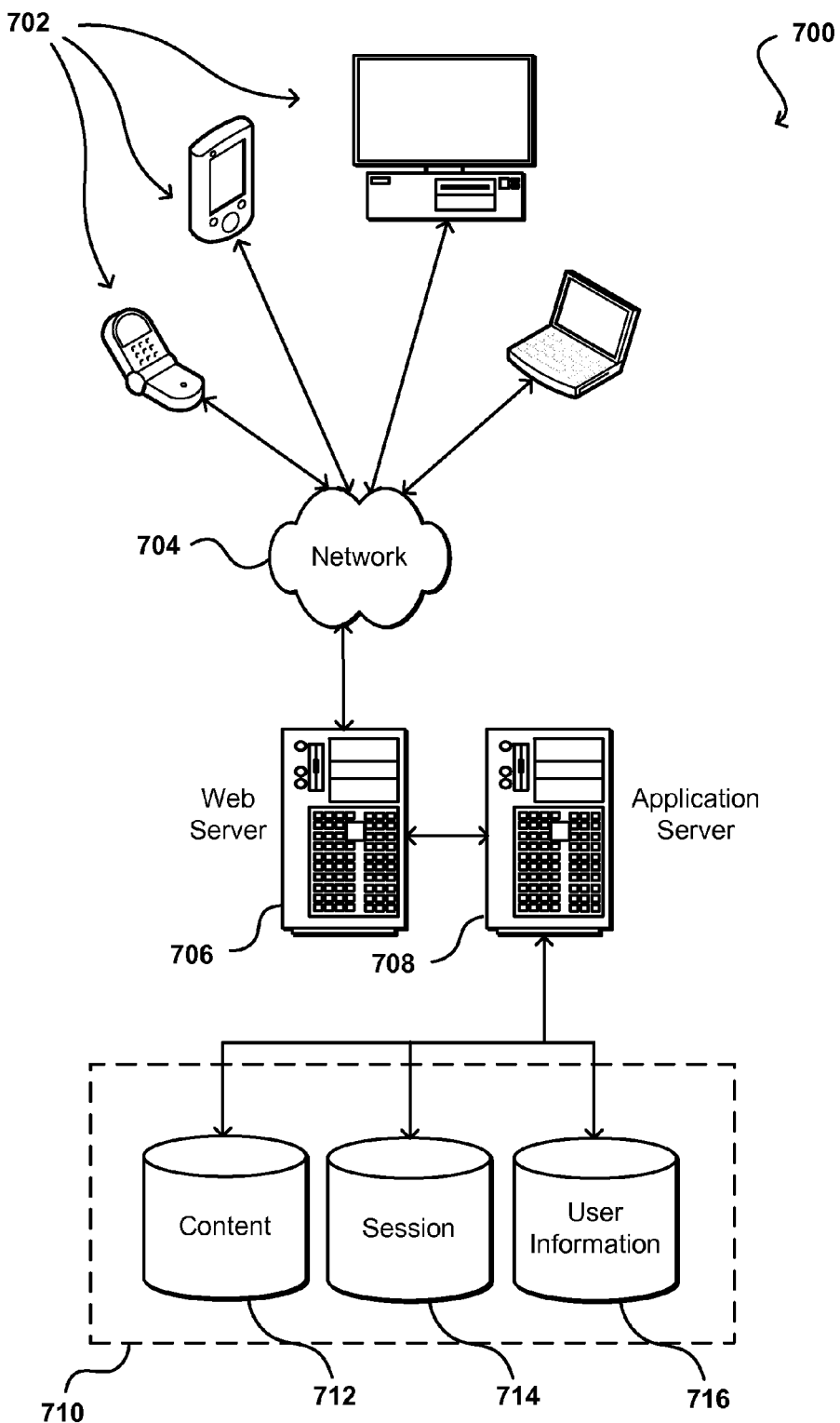
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of controlling an electronic device using a portable computing device, comprising:
   detecting an electronic device over a wireless channel of a portable computing device;
   establishing communications with the electronic device over the wireless channel;
   submitting, to a remote server, a request to receive information for controlling at least one aspect of the electronic device;
   receiving, from the remote server, the information for controlling the at least one aspect of the electronic device, the information including information indicating one or more capabilities of the electronic device;
   detecting a lateral motion of the portable computing device in a plane parallel to a reference surface;
   determining, using a processor of the portable computing device, a command for the electronic device based at least in part upon the determined capabilities of the electronic device and the detected lateral motion of the portable computing device; and
   sending the command from the portable computing device to the electronic device over the wireless channel,
   wherein the portable computing device is configured to at least be used as a wireless control mechanism for at least one aspect of the detected electronic device such that the detected lateral motion of the portable computing device corresponds to movement of a pointer on a display of the electronic device.

2. The method of claim 1, wherein the portable computing device is one of a smart phone, a tablet computer, and a portable media player.

3. The method of claim 1, wherein the electronic device is one of a monitor, keyboard, projector, television, notebook computer, and personal computer.

4. The method of claim 1, wherein the wireless channel includes at least one of a Bluetooth channel, a cellular channel, or a Wi-Fi channel.

5. The method of claim 1, further comprising:
   determining a format for communications with the electronic device.

6. The method of claim 5, further comprising:
   determining a set of available commands for the electronic device.

7. The method of claim 6, wherein determining a command for the electronic device further depends at least in part upon the determined format for communications and the set of available commands.

8. The method of claim 1, further comprising:
   requesting authorization for the portable computing device to provide one or more commands for the electronic device.

9. The method of claim 1, wherein sending the command from the portable computing device to the electronic device over the wireless channel includes sending the command from the portable electronic device to a third party device configured to translate the command sent from the portable computing device to a command understandable by the electronic device.

10. The method of claim 1, wherein an input is detected through at least one of an applied pressure, physical contact, gesture, or audio command of a user with respect to the portable computing device.

11. The method of claim 1, wherein motion of the electronic device is determined at least in part by monitoring a change in position of one or more features located in image information captured using at least one image capture element of the portable computing device.

12. The method of claim 11, wherein the image capture element includes at least one of an ambient light digital camera, a digital video camera, and an infrared sensor.

13. The method of claim 1, wherein motion of the electronic device is determined at least in part using at least one position-determining element of the portable computing device.

14. The method of claim 13, wherein the at least one position-determining element includes at least one of an accelerometer, an inertial sensor, an electronic gyroscope, an electronic compass, and a global positioning system (GPS) device.

15. The method of claim 1, wherein the portable computing device is configured for being positioned on a power pad operable to capacitively charge the portable computing device.

16. The method of claim 15, wherein the portable computing device is further configured to determine motion relative to at least one feature of the power pad using at least one of pressure-based input and image input.

17. The method of claim 15, wherein the portable computing device is configured to automatically establish control communications with at least one electronic device when placed on the power pad.

18. The method of claim 1, wherein the portable computing device is further configured to concurrently control multiple electronic devices.

19. The method of claim 1, wherein multiple portable computing devices are configured for concurrently sending commands to the electronic device for at least one aspect of the electronic device.

20. A method of interfacing with electronic devices, comprising:

detecting one or more electronic devices over a wireless channel of a portable computing device;

establishing communications with at least one of the electronic devices over the wireless channel;

submitting, to a remote server, a request to receive information for controlling at least one aspect of the at least one of the electronic devices;

receiving, from the remote server, the information for controlling the at least one aspect of the at least one of the electronic devices;

detecting a lateral motion of the portable computing device; and sending information of the lateral motion from the portable computing device to the at least one electronic device over the wireless channel, wherein the portable computing device is configured to at least be used as a wireless control mechanism for at least one aspect of the one or more detected electronic devices over a wireless channel such that the detected lateral motion of the portable computing device corresponds to movement of a pointer on a display of at least one of the one or more detected electronic device.

21. The method of claim 20, wherein the portable computing device is one of a smart phone, a tablet computer, and a portable media player.

22. The method of claim 20, wherein the electronic device is one of a monitor, keyboard, projector, notebook computer, desktop computer, or television.

23. The method of claim 22, wherein portable computing device is configured to execute a desktop application on the portable computing device and export a virtual version of that desktop application to be displayed on the electronic device.

24. The method of claim 20, wherein the wireless channel includes at least one of a Bluetooth channel, a cellular channel, or a Wi-Fi channel.

25. A portable computing device, comprising:
a processor;
at least one input detection element; and
a memory device including instructions operable to be executed by the processor to perform a set of actions, enabling the computing device to:
  establish communications with an electronic device over a wireless channel;
  submit, to a remote server, a request to receive information for controlling at least one aspect of the electronic device;
  receive, from the remote server, the information for controlling the at least one aspect of the electronic device;
  detect a lateral motion of the portable computing device; and
  send information of the lateral motion to the electronic device over the wireless channel,
  wherein the portable computing device is configured to at least be used as a wireless control mechanism for at least one aspect of the detected electronic device such that the detected lateral motion of the portable computing device corresponds to movement of a pointer on a display of the electronic device.

26. The portable computing device of claim 25, wherein the information includes one or more commands enabling the portable computing device to act as a control mechanism for the at least one electronic device.

27. The portable computing device of claim 25, wherein the instructions are executed on the portable computing device, the information sent to the electronic device including results of the processing.

28. The portable computing device of claim 27, wherein the instructions include instructions for a virtual desktop application, the information sent to the electronic device including an export of a state of the virtual desktop application for display on the electronic device.

29. A non-transitory computer-readable storage medium storing processor-executable instructions for controlling an electronic device, comprising:
program code for detecting an electronic device over a wireless channel of a portable computing device;
program code for establishing communications with the electronic device over the wireless channel;
program code for submitting, to a remote server, a request to receive information for controlling at least one aspect of the electronic device;
program code for receiving, from the remote server, the information for controlling the at least one aspect of the electronic device;
program code for detecting a lateral motion of the portable computing device; and
program code for sending information for the lateral motion from the portable computing device to the electronic device over the wireless channel,
wherein the portable computing device is configured to at least be used as a wireless control mechanism for at least one aspect of the detected electronic device such that the detected lateral motion of the portable computing device corresponds to movement of a pointer on a display of the electronic device.

30. The non-transitory computer-readable storage medium of claim 29, wherein the information includes one or more commands enabling the portable computing device to act as a control mechanism for the at least one electronic device.

31. The non-transitory computer-readable storage medium of claim 29, wherein the instructions are executed on the portable computing device, the information sent to the electronic device including results of the processing.

32. The non-transitory computer-readable storage medium of claim 31, wherein the instructions include instructions for a virtual desktop application, the information sent to the electronic device including an export of a state of the virtual desktop application for display on the electronic device.

* * * * *